3,198,836
PROCESS FOR THE PREPARATION OF POLY-
ENECARBONYL COMPOUNDS
Roman Marbet, Riehen, and Ulrich Schwieter, Basel,
Switzerland, assignors to Hoffmann-La Roche Inc.,
Nutley, N.J., a corporation of New Jersey
No Drawing. Filed May 2, 1961, Ser. No. 107,058
Claims priority, application Switzerland, May 11, 1960,
5,399/60
14 Claims. (Cl. 260—586)

The present invention relates to a new, improved process for the preparation of polyenecarbonyl compounds. More particularly, the invention relates to the process of reacting an aldehyde that contains a double bond in at least the α,β- and γ,δ-positions, relative to the aldehyde group, in the presence of a lower aliphatic alkanol and an acid condensing agent with an excess quantity of an enol ether of the formula

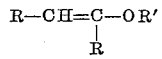

wherein one of the R groups is a lower alkyl group, the other R group is hydrogen or a lower alkyl group and R' is a lower alkyl group, and treating the reaction product with an acid; and to the products prepared thereby.

Examples of polyene aldehydes that can be employed in the process of the invention include the following:

6-(2',6',6'-trimethyl-cyclohexen-1'-yl) - 4 - methyl-2,4-hexadien-1-al, 15-(2',6',6' - trimethyl - cyclohexen-1'-yl) - 4,9,13 - trimethyl - 2,4,8,10,12,14 - pentadecahexaen-6-yn-1-al (prepared by the process of copending application 767,278, filed October 15, 1958, to Isler et al., now abandoned).

19-(2',6',6'-trimethyl - cyclohexen - 1' - yl) - 4,8,13,17-tetramethyl-2,4,6,8,12,14,16,18-nonadecaoctaen - 10 - yn-1-al, 23-(2',6',6'-trimethyl - cyclohexen-1'-yl) - 4,8,12,17,21-pentamethyl-2,4,6,8,10,12,16,18,20,22 - tricosadecaen - 14-yn-1-al.

The last two compounds are prepared by the process of co-pending application 49,409, filed August 15, 1960, to Isler et al., now U.S. Patent No. 3,091,631, issued May 28, 1963.

Especially suitable enol ethers are the lower alkyl ethers, particularly the methyl or ethyl ethers, of the following compounds:

Propen-1-ol-1,
Propen-2-ol-2,
Buten-2-ol-2.

In the first step of the process the aldehyde starting material is condensed with an enol ether in the presence of an acidic condensing agent and a lower aliphatic alkanol to form an ether acetal. The acidic condensing agent is preferably a strong acidic agent such as the mineral acids, for example sulfuric acid, Lewis acids, e.g., borontrifluoride etherate; and strongly acidic organic acids such as p-toluene sulfonic acid, oxalic acid, trichloro acetic acid and formic acid. The use of sulfuric acid or borontrifluoride etherate is especially advantageous. Furthermore, it is desirable to employ the lower aliphatic alkanol, which is preferably methanol, ethanol or butanol, in excess. The enol ether employed in the condensation is also preferably used in considerable excess. Particularly good yields are obtained by employing at least two parts by volume of enol ether per part by weight of aldehyde. The condensation is preferably carried out at the lowest possible operable reaction temperature, in order to minimize undesirable side reactions. The optimum reaction temperature depends on the choice of the acidic condensing agent and on the aldehyde and enol ether chosen, and is selected from the range of from about 0° to about 30° C. In the preferred process the starting materials are reacted in the presence of borontrifluoride etherate at a temperature in the range of about 0° to about 5° C. There is obtained thereby substantially pure ether acetal in high yield that need not be subjected to any further purification.

The ether acetal so obtained is then hydrolyzed in an acid medium. The hydrolysis proceeds with simultaneous splitting off of alcohol. This reaction step can suitably be carried out in the presence of a water soluble nonvolatile organic or inorganic acid such as p-toluene sulfonic acid, acetic acid, propionic acid, oxalic acid, sulfuric acid, phosphoric acid or a water soluble acid salt such as zinc chloride or sodium bisulfite. Acetic acid with the addition of a little water is preferred. The hydrolysis is conveniently carried out in the presence of an added sodium salt, preferably sodium acetate, sodium carbonate or borax. The reaction is preferably carried out with exclusion of oxygen and the addition of an antioxidant, e.g., hydroquinone. The reaction is best carried out under conditions wherein the alcohol formed by the reaction distills off from the reaction mixture. A water miscible solvent can be employed such as dioxane, tetrahydrofuran, ethyleneglycoldimethylether, etc., in order to obtain a homogeneous reaction mixture. The preferred process for the hydrolysis involves either (a) heating the ether acetal with acetic acid, an alkali metal salt, and water to a temperature ranging from about 50° C. to the boiling point of the reaction mixture, or (b) boiling a solution of the ether acetal in dilute acetic acid under reflux conditions.

The acetylenic aldehydes of this invention are useful as color-imparting agents. They may be used to impart a yellow-to-red color in foodstuffs or as poultry feed additives for promoting better coloring in skin, shanks, and egg yolks, as disclosed, for example, in above-mentioned U.S. Patent No. 3,091,631. In addition, they are useful as intermediates for the production of other acetylenic aldehydes and other synthetic pigments such as the apo-carotenals. The polyolefinic aldehydes and ketones prepared by the process of the invention are useful as intermediates for the preparation of carotenoids, e.g., 8-(2',6',6'-trimethyl-cyclohexen-1'-yl)-2,6 - dimethyl-2,4,6-octatrien-1-al is an intermediate for the preparation of β-carotene.

*Example 1*

100 g. of 6-(2',6',6'-trimethyl-cyclohexen-1'-yl)-4-methyl-2,4-hexadien-1-al is suspended in 300 ml. of ethanol. After cooling this mixture in an ice-bath, 10 ml. of of borontrifluoride etherate is added thereto, followed by 300 ml. of ethyl propenyl ether which is dropped into the reaction mixture over the course of 3 hours. During the addition it is important not to let the temperature of the mixture rise above +5° C. The reaction mixture is then allowed to stand overnight and the following day 10 ml. of pyridine is added thereto. Excess ethanol and propionacetal are evaporated off and the residue in the flask washed with 360 ml. of glacial acetic acid into a 1-liter 4-necked flask provided with a thermometer, nitrogen inlet tube, and reflux condenser. The mixture is treated with 36 ml. of water, 1 g. of hydroquinone and 36 g. of sodium acetate. The flask is heated in an oil bath at 120° for 2 hours with stirring and continuous introduction of nitrogen. Thereafter the brown homogeneous solution is poured with stirring onto 600 g. of ice. The stirring is continued for one hour at 0° C. and the resulting yellow powder filtered off. The precipitate is compacted and washed twice with ice water. After recrystallization from isopropyl alcohol the obtained 8-

(2',6,'6'-trimethyl-cyclohexen-1'-yl)-2,6-dimethyl - 2,4,6-octatrien-1-al melts at 66° C.

Example 2

100 g. of 15 - (2',6',6'-trimethyl-cyclohexen-1'-yl)-4,9,13 - trimethyl - 2,4,8,10,12,14 - pentadecahexaen - 6-yn-1-al is stirred with 500 ml. of ethanol and the mixture cooled to 0° to 5° C. 10 ml. of borontrifluoride etherate is added thereto; then, over the course of 2 to 3 hours, 500 ml. of ethyl propenyl ether is added from a dropping funnel, while taking care that the temperature of the mixture does not rise above +5° C. Thereafter the mixture is stirred for an additional 17 hours under an atomsphere of nitrogen at a temperature of 0° to 5° C. Then 10 ml. of quinoline is added and the excess ethanol and propionacetal removed under vacuum at a temperature of 50° C. The oily residue is washed with 360 ml. of glacial acetic acid into a 1-liter flask equipped with a thermometer, nitrogen inlet tube, and reflux condenser. 36 g. of sodium acetate is then added to the mixture. The mixture is boiled while stirring during the course of 2 hours under reflux using an oil bath heated to 120° C. The mixture is cooled while stirring to a temperature of 15–20° C., whereupon a solid compound begins to precipitate. This solid is filtered off with suction and washed with 200 ml. of isopropanol. It is then extracted with 600 ml. of high-boiling petroleum ether. The residue is washed again with 200 ml. of hot, high-boiling petroleum ether, and the combined petroleum ether filtrates cooled to a temperature of 0° to 5° C. Thereupon 17-(2',6',6'-trimethyl - cyclohexen - 1' - yl) - 2,6,11,15 - tetramethyl-2,4,6,10,12,14,16-heptadecaheptaen-8-yn-1 - al of melting point 133–134° C. precipitates out.

Example 3

20 g. of 19-(2',6',6'-trimethyl-cyclohexen-1',yl)-4,8-13,17 - tetramethyl - 2,4,6,8,12,14,16,18 - nonadecaoctaen-10-yn-1-al is mixed with 40 ml. of methylene chloride and 2 ml. of boron-trifluoride etherate added thereto. Thereupon is added in portions a mixture of 60 ml. of ethanol and 60 ml. of ethyl propenyl ether over the course of 1 hour. The resulting mixture is stirred for 6 hours at a temperature of 0–5° C. Thereafter 2 ml. of pyridine is added, and the methylene chloride, residual ethanol, and the resulting propionacetal are distilled off on a steam bath under the vacuum of a water pump. In order to hydrolyze the intermediate obtained thereby as residue, 20 ml. of glacial acetic acid, 2 g. of sodium acetate and 2 ml. of water are added and the resulting mixture heated with stirring under reflux to 80° C. for 15 hours. Upon cooling, 21 - (2',6',6'-trimethyl-cyclohexen-1'-yl)-2,6,10,15,19 - pentamethyl - 2,4,6,8,10,14,16,18,20 - heneicosanonaen-12-yn-1-al crystallizes out in red leaflets. After recrystallization from benzene there is obtained a pure product having a melting point of 175–177° C.;

U.V. absorbtion at 459 mµ, $E_1^1 = 2350$ (petroleum ether)

Example 4

20 g. of 23-(2',6',6'-trimethyl-cyclohexen-1'-yl)-4,8,12,17,21 - pentamethyl - 2,4,6,8,10,12,16,18,20,22 - tricosadecaen-14-yn-1-al is mixed with 20 ml. of benzene and then treated with a solution of 0.5 ml. of concentrated sulfuric acid in 60 ml. of ethanol. To this is added portionwise 60 ml. of ethyl propenyl ether while stirring during the course of 1 hour at 20–30° C. After the addition of 1 ml. of pyridine the solvent medium is evaporated off completely on a steam bath under the vacuum of a water pump and the residue hydrolyzed by heating it with a solution of 2 g. of sodium acetate in 2 ml. of water and 20 ml. of glacial acetic acid during 15 hours. Upon cooling, red 25 - (2',6',6' - trimethyl-cyclohexen-1'-yl)-2,6,10,14,19,23 - hexamethyl-2,4,6,8,10,12,14,18,20,22,24-pentacosaundecaen-16-yn-1-al crystallizes out, which is then recrystallized from benzene, melting point 182–183° C.;

U.V. absorption at 481 mµ, $E_1^1 = 2780$ (petroleum ether)

Example 5

10 g. of 6-(2',6',6'-trimethyl-cyclohexen-1'-yl)-4-methyl-2,4-hexadien-1-al is suspended in 30 ml. of ethanol and 1 ml. of borontrifluoride etherate is added. Then 30 ml. of 2-ethoxy-2-butene is added at 0° C. with stirring. Stirring is continued for 20 hours at 0° C., after which 1 ml. of pyridine is added thereto and the volatile portion evaporated off under the vacuum of a water pump at a bath temperature of 60° C. The oily residue is warmed with 3.6 ml. of water and 3.6 g. of sodium carbonate in 36 ml. of glacial acetic acid during the course of 2 hours under reflux in an oil bath maintained at 120° C. Then the reaction mixture is poured onto ice and the precipitate taken up in methylene chloride. After evaporating off the methylene chloride there is obtained 9-(2',6',6'-trimethyl-cyclohexen-1'-yl) - 3,7 - dimethyl-3,5,7-nonatrien-2-one which is recrystallized from methanol, melting point 90° C.;

U.V. absorbtion at 308 mµ, $E_1^1 = 1685$; and at 321 mµ $E_1^1 = 1540$ (petroleum ether)

The foregoing examples are given for illustration purposes only and are not intended to limit the invention. Variations in the process of the invention can be carried out by those skilled in the art without departing from either the scope or spirit of the invention.

We claim:

1. A process for the preparation of polyenecarbonyl compounds comprising the steps of reacting an aldehyde containing a double bond in the α,β- and γ,δ-positions relative to the aldehyde group in the presence of a lower aliphatic alkanol and an acidic condensing agent selected from the group consisting of mineral acids, Lewis acids, and strong acidic organic acids with an excess quantity of an enol ether of the formula

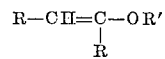

wherein R is selected from the group consisting of hydrogen and a lower alkyl group, wherein at least one R in the above formula is a lower alkyl group, and R' is a lower alkyl group,
to form a reaction product, and hydrolyzing the reaction product with an acid.

2. A process according to claim 1 wherein the lower aliphatic alkanol is selected from the group consisting of methanol and ethanol.

3. A process according to claim 1 wherein said acidic condensing agent is borontrifluoride etherate.

4. A process according to claim 1 wherein said acidic condensing agent is sulfuric acid.

5. A process according to claim 1 wherein at least twice as much by volume of alkanol is employed as aldehyde.

6. A process according to claim 1 wherein at least two parts by volume of enol ether is employed per part of aldehyde.

7. A process according to claim 1 wherein a reaction temperature of from about 0° to about 30° C. is employed.

8. A process according to claim 1 wherein the acid employed to hydrolyze the reaction product is aqueous acetic acid.

9. A process for the preparation of 8-(2',6',6'-trimethyl-cyclohexen-1'-yl) - 2,6 - trimethyl - 2,4,6 - octatrien-1-al comprising the steps of reacting 6-(2',6',6'-trimethyl-cyclohexen-1'-yl)-4-methyl-2,4-hexadien-1-al in the presence of borontrifluoride etherate and a lower alkanol with ethyl propenyl ether, and hydrolyzing the resulting reaction product with acetic acid.

10. A process for the preparation of 17-(2',6',6'-trimethyl-cyclohexen-1'-yl) - 2,6,11,15 - tetramethyl - 2,4,6, 10,12,14,16 - heptadecaheptaen-8-yn-1-al comprising the steps of reacting 15-(2′,6′,6′-trimethyl-cyclohexen-1′-yl)-4,9,13 - trimethyl - 2,4,8,10,12,14 - pentadecahexaen-6-yn-1-al in the presence of borontrifluoride etherate with ethyl propenyl ether, and hydrolyzing the resulting reaction product wtih acetic acid.

11. A process for the preparation of 21-(2′,6′,6′-trimethyl-cyclohexen - 1′ - yl) - 2,6,10,15,19 - pentamethyl-2,4,6,8,10,14,16,18,20 - heneicosanonaen-12-yn-1-al comprising the steps of reacting 19-(2′,6′,6′-trimethyl-cyclohexen-1′-yl) - 4,8,13,17 - tetramethyl-2,4,6,8,12,14,16,18-nonadecaoctaen-10-yn-1-al in the presence of borontrifluoride etherate with ethyl propenyl ether, and hydrolyzing the resulting reaction product with acetic acid.

12. A process for the preparation of 25-(2′,6′,6′-trimethyl-cyclohexen-1′-yl) - 2,6,10,14,19,23 - hexamethyl-2,4,6,8,10,12,14,18,20,22,24 - pentacosaundecaen-16-yn-1-al comprising the steps of reacting 23-(2′,6′,6′-trimethyl-cyclohexen-1′-yl) - 4,8,12,17,21 - pentamethyl-2,4,6,8,10,12,16,18,20,22-tricosadecaen-14-yn-1-al in the presence of sulfuric acid and a lower alkanol, and hydrolyzing the resulting reaction product with acetic acid.

13. A process for the preparation of 9-(2′,6′,6′-trimethyl-cyclohexen-1′-yl) - 3,7 - dimethyl-3,5,7-nonatrien-2-one comprising the steps of reacting 6-(2′,6′,6′-trimethyl-cyclohexen-1′-yl) - 4 - methyl-2,4-hexadien-1-al in the presence of borontrifluoride etherate and a lower alkanol, and hydrolyzing the resulting reaction product with acetic acid.

14. A process for the preparation of polyenecarbonyl compounds comprising the steps of reacting an aldehyde containing a double bond in the α,β- and γ,ε-positions relative to the aldehyde group in the presence of at least twice as much by volume of a lower aliphatic alkanol, and in the presence of an acidic condensing agent selected from the group consisting of mineral acids, Lewis acids, and strongly acidic organic acids with at least two parts by volume per part by weight of aldehyde of an enol ether of the formula

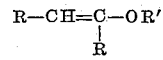

wherein R is selected from the group consisting of hydrogen and a lower alkyl group, wherein at least one R in the above formula is a lower alkyl group, and R′ is a lower alkyl group,
at a temperature of from about 0 to about 30° C. to form a reaction product, and hydrolyzing the reaction product with an acid.

References Cited by the Examiner

UNITED STATES PATENTS

| | | | |
|---|---|---|---|
| 2,502,433 | 4/50 | Copenhaver | 260—615 |
| 2,543,312 | 2/51 | Copenhaver | 260—599 XR |
| 2,564,760 | 8/51 | Hoaglin et al. | 260—615 |
| 2,564,761 | 8/51 | Hoaglin et al. | 260—615 XR |
| 2,912,468 | 11/59 | Copenhaver | 260—615 XR |
| 2,957,889 | 10/60 | Hoaglin et al. | 260—598 XR |

OTHER REFERENCES

Ruegg et al.: Helv. Chim. Acta, vol. 42 (1959), pages 854–864, page 855 relied on.

LEON ZITVER, *Primary Examiner.*

CHARLES B. PARKER, *Examiner.*

UNITED STATES PATENT OFFICE
CERTIFICATE OF CORRECTION

Patent No. 3,198,836                                               August 3, 1965

Roman Marbet et al.

It is hereby certified that error appears in the above numbered patent requiring correction and that the said Letters Patent should read as corrected below.

Column 4, line 32, for "an" read -- a hydrocarbon polyene --; line 38, for "an excess quantity" read -- at least 2 parts by volume --; line 47, before "to" insert -- per part by weight of said aldehyde at a temperature of from about 0 to about 30° C. --; line 48, for "an" read -- a water-soluble nonvolatile --; line 54, beginning with "4. A process" strike out all to and including "is employed.", in lines 62 and 63, same column 4; line 64, for "8." read -- 4. --; line 67, for "9." read -- 5. --; line 72, after "with" insert -- at least 2 parts by volume of --; same line 72, after "ether" insert -- per part by weight of 6-(2′,6′,6′-trimethyl-cyclohexen-1′-yl)-4-methyl-2,4-hexadien-1-al at a temperature of from about 0 to about 30° C. --; same column 4, line 74, for "10." read -- 6. --; column 5, line 4, for "etherate with" read -- etherate and a lower alkanol with at least 2 parts by volume of --; line 5, after "ether" insert -- per part by weight of 15-(2′,6′,6′-trimethyl-cyclohexen-1′-yl)-4,9,13-trimethyl-2,4,8,10,12,14-pentadecahexaen-6-yn-1-al at a temperature in a range of from about 0 to about 30° C. --; line 7, for "11." read -- 7. --; line 13, for "etherate with" read -- etherate and a lower alkanol with at least 2 parts by volume of --; same column 5, same line 13, after "ether" insert -- per part by weight of 19-(2′,6′,6′-trimethyl-cyclohexen-1′yl)-4,8,13,17-tetramethyl-2,4,6,8,12,14,16,18-nonadecaoctaen-10-yn-1-al at a temperature in a range of from about 0 to about 30° C. --; line 14, for "12." read -- 8. --; line 21, after "alkanol insert -- with at least 2 parts by volume of ethyl propenyl ether per part by weight of 23-(2′,6′,6′-trimethyl-cyclohexen-1′-yl)-4,8,12,17,21-pentamethyl-2,4,6,8,10,12,16,18,20,22-tricosadecaen-14-yn-1-al at a temperature of from about 0 to about 30° C. --; line 23, for "13." read -- 9. --; line 27, after "alkanol" insert -- with at least 2 parts by volume of 2-ethoxy-2-butene per part 3,198,836 by weight of 6-(2´,6´,6´-trimethyl-cyclohexen-1´-yl)-4-methyl-2,4-hexadien-1-al at a temperature of from about 0 to about 30° C. --; line 30, for "14." read -- 10. --; same column 5, line 31, for "an read -- a hydrocarbon polyene --; column 6, line 5, after "of", first occurrence, insert -- said --; line 16, for "an" read -- a water-soluble non-volatile --; in the heading to the printed specification, line 10, for "14 Claims" read -- 10 Claims --.

Signed and sealed this 22nd day of February 1966.

(SEAL)
Attest:

ERNEST W. SWIDER
Attesting Officer

EDWARD J. BRENNER
Commissioner of Patents